Patented Feb. 7, 1939

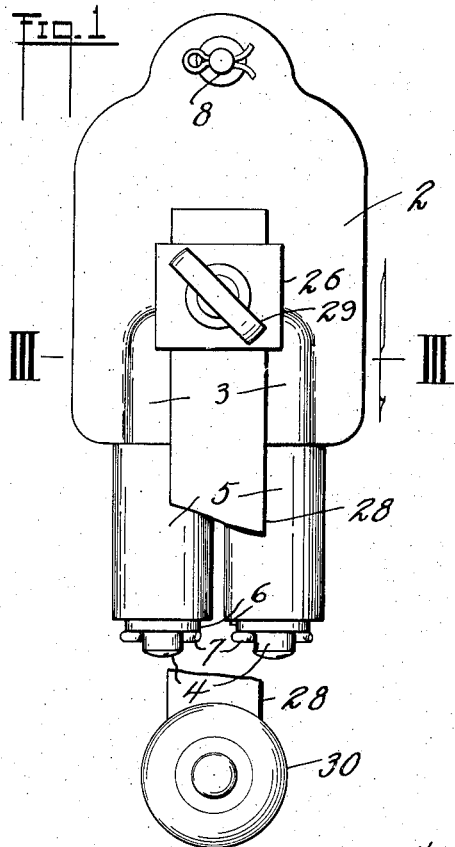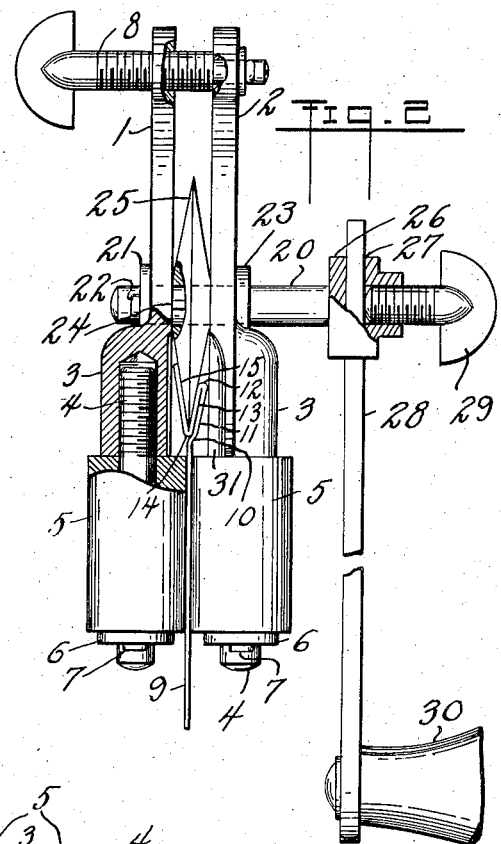

2,146,659

UNITED STATES PATENT OFFICE 2,146,659

SEAM PREPARATION TOOL

Arthur A. Stewert, Toledo, Ohio

Application September 30, 1937, Serial No. 166,482

3 Claims. (Cl. 81—15)

This invention relates to opening sheet metal as for a seam.

This invention has utility in opening sheet metal folds as pre-formed for subsequent seaming, especially for air ducts, pipe, roofing, etc.

Referring to the drawing:

Fig. 1 is a side elevation, with parts broken away, of an embodiment of the invention as a tinner's tool;

Fig. 2 is a view from the left of the device of Fig. 1, with parts broken away;

Fig. 3 is a section on the line III—III, Fig. 2;

Fig. 4 is a diagrammatic view of an embodiment of a seam pre-fold as supplied to the tinning trade;

Fig. 5 is a view of the fold of Fig. 4 as spread by the tool herein to contribute to ease in assembly;

Fig. 6 is the next stage from the showing of Fig. 5 with the additional sheet entering in the spread fold for coaction therewith in the seam;

Fig. 7 is the fold back from the spread wing for interlocking position with the additional sheet in completing the seam; and Fig. 8 is a view of a duct as embodying a seam therewith.

In carrying out the invention, pair of plates 1, 2, is provided. Bosses 3 provide seats for pair of stems 4 as to each plate 1 and 2. Each of these stems 4 carries clamping or gripping roller 5, held in position on the stem 4 by washer 6 as held by key 7. These rollers 5 protrude in a common direction from the pair of plates 1, 2, remote from wing screw 8 having thread connection with the plate 1 and swivel connection with the plate 2. This means that by rotating the wing screw 8, the plates 1, 2, may be spread adjacent the wing screw 8, thereby to throw pair of rollers 5 on the plate 1 toward the pair of rollers 5 on the plate 2 to bring such rollers into clamping position with work sheet 9 therebetween in providing a roller clamp gripping such sheet adjacent its edge but inward from fold comprising offset 10, outwardly extending portion 11, return bend 12, inwardly extending portion 13 parallel to the portion 11, return bend 14 with free wing 15 extending from the return bend 14 beyond the return bend 12. This seam element as supplied in the factory is usually in a compact set-up so close as between the wing screw 15 and the opposing side 13 as to preclude insertion of terminal flange 16 extending past bend 17 of companion sheet 18 to be locked therewith.

Accordingly, in practice there is necessity for opening out this wing 15 away from the opposing portion 13. This course is initially undertaken by use of a screw driver or similar wedge tool and creating flare region 19 (Fig. 3). It is a slow, tedious and uneven job to continue around with a wedge or similar type hand tool to effect the spread to receive the interlocking sheet portion 16. In the embodiment of my invention shown in the drawing, a shaft 21 extends through apertures formed in the arms 1 and 2 and supports a spreader wheel or wedge disk 25. The shaft 20 is maintained in assembled position by the collar 23 formed integral with said shaft, and by means of a washer 21 held in position upon the other end of the shaft by a key 22. The spreader wheel 25 is secured to the shaft 20 for rotation therewith by means of a key 24. In the use of the device, the wedge wheel 25 is mounted in position just short of the return bend 14 with the result that the wing 15 is spread away from the side 13 as the device is moved along the work through rotation of the disk 25. This rotation is effected herein by mechanism on the shaft 20. This shaft 20, remote from the plate 1, has hub or boss 26 with diametrical slot 27 therethrough in which is inserted crank arm 28 to be locked into adjustable crank length position by wing screw 29, thereby locating handle grip 30 at the desired crank throw relation for clearing stock or mechanical advantage desired.

While for straightaway showing the plates 1, 2, may have the opposing sides parallel, there is occasion to form elbows, bends, or contour portion in the sheet stock away from straight line, and this is effected by outwardly curved wall portions 31 for these plates from the shaft 20 toward the rollers 5. This will allow the tool to take the bend as set up for the seam section as supplied, even on quite short radius of curvature and within the practical demands of the trade, while for straightaway it is still effective as a follower. By rotating the crank 30, the wheel 25 is the traveler in spreading the groove uniformly and the rollers 5 by their gripping coaction inward from the fold provide free edge direct and hold the tool in meshing relation in the groove of the fold. This tool means that in practice there is a symmetrical stage effected rapidly in the work as a time saver as well as a factor of value in improving the product for air tight duct production.

What is claimed and it is desired to secure by Letters Patent is:

1. A tool for operation on a sheet metal part bounded by a seam fold having an outwardly extending wing, said tool comprising an adjustable twin plate bracket, two pairs of oppositely disposed gripping rollers mounted upon said bracket for engagement with the sheet metal part inwardly of the seam fold, a spreading roller mounted on said clamp for insertion into the seam fold adjacent said wing, and a crank for rotating the spreading roller to cause said spreading roller and said clamp to travel along the edge of said sheet metal part with a resultant separation of said wing from the remainder of said fold by said spreading roller.

2. A tool for operation on a sheet metal part bounded by a seam fold having an outwardly extending wing, said tool comprising an adjustable twin plate bracket, two pairs of oppositely disposed cylindrical gripping rollers mounted upon said bracket for engagement with the sheet metal part inwardly of the seam fold, a tapered spreading roller mounted on said clamp for insertion into the seam fold adjacent said wing, and driving means for rotating the spreading roller to cause said spreading roller and said clamp to travel along the edge of said sheet metal part with a resultant separation of said wing from the remainder of said fold by said spreading roller.

3. A tool for operation on a sheet metal part to effect re-shaping of an edge thereof, said tool comprising an adjustable twin plate bracket, oppositely disposed gripping rollers mounted upon said bracket for engagement with the sheet metal part adjacent said edge, a shaping roller mounted on said clamp for engagement with the sheet metal part intermediate said edge and the rollers, and driving means for rotating the shaping roller to cause said shaping roller and said clamp to travel along said sheet metal adjacent said edge with a resultant re-shaping of said edge of sheet metal by said shaping roller.

ARTHUR A. STEWERT.